United States Patent
Huege

(10) Patent No.: US 10,597,838 B2
(45) Date of Patent: Mar. 24, 2020

(54) METHOD FOR THE ELIMINATION OF ADVERSE SWELLING OF SULFATE BEARING SOILS

(71) Applicant: Fred Robert Huege, Lakewood, NJ (US)

(72) Inventor: Fred Robert Huege, Lakewood, NJ (US)

( * ) Notice: Subject to any disclaimer, the term of this patent is extended or adjusted under 35 U.S.C. 154(b) by 0 days.

(21) Appl. No.: 16/041,924

(22) Filed: Jul. 23, 2018

(65) Prior Publication Data

US 2020/0024817 A1   Jan. 23, 2020

(51) Int. Cl.
*E02D 3/12* (2006.01)
*C09K 17/08* (2006.01)

(52) U.S. Cl.
CPC .............. *E02D 3/12* (2013.01); *C09K 17/08* (2013.01); *E02D 3/123* (2013.01)

(58) Field of Classification Search
CPC ............ E02D 3/12; E02D 3/123; C09K 17/08
See application file for complete search history.

(56) References Cited

U.S. PATENT DOCUMENTS

| | | | | |
|---|---|---|---|---|
| 5,122,012 A * | 6/1992 | Walker, Jr. | ............. | C09K 17/02 106/900 |
| 6,027,558 A * | 2/2000 | Little | ............. | C08L 95/00 106/284.04 |
| 6,540,826 B2 * | 4/2003 | Sommer | ............. | C04B 22/126 106/724 |
| 2004/0258612 A1 * | 12/2004 | Huege | ............. | C01F 11/02 423/640 |
| 2007/0036701 A1 * | 2/2007 | Huege | ............. | C01F 11/02 423/117 |
| 2007/0036702 A1 * | 2/2007 | Huege | ............. | C01F 7/74 423/117 |
| 2007/0104630 A1 * | 5/2007 | Huege | ............. | C04B 2/02 423/155 |
| 2009/0003939 A1 * | 1/2009 | Im | ............. | C04B 28/02 405/263 |
| 2012/0118831 A1 * | 5/2012 | Hemmings | ............. | B01J 20/0229 210/717 |
| 2012/0216720 A1 * | 8/2012 | Deng | ............. | C04B 22/126 106/692 |
| 2013/0284069 A1 * | 10/2013 | Dubey | ............. | C04B 7/32 106/695 |
| 2013/0284070 A1 * | 10/2013 | Dubey | ............. | C04B 11/28 106/695 |
| 2015/0175481 A1 * | 6/2015 | Pisklak | ............. | E21B 33/138 264/31 |
| 2016/0272887 A1 * | 9/2016 | Tao | ............. | C04B 28/006 |
| 2016/0318802 A1 * | 11/2016 | Ferrari | ............. | C04B 28/04 |

* cited by examiner

*Primary Examiner* — Benjamin F Fiorello

(57) ABSTRACT

A method is shown for reducing the adverse swelling action of sulfates in clay bearing soils during lime stabilization by treating soils having high sulfate content with a soluble aluminum compound that can react with the sulfate ions in the soil to form ettringite or other swelling species during the initial reaction with lime stabilization prior to compaction and paving of the lime treated soil. The amount of soluble aluminum ions added to the soil is determined by the concentration of sulfate in the soil and the other soil parameters such as the soils PI, clay type, etc.

2 Claims, No Drawings

METHOD FOR THE ELIMINATION OF ADVERSE SWELLING OF SULFATE BEARING SOILS

(1) BACKGROUND OF THE INVENTION

1. Field of the Invention

The present invention relates generally to soil stabilization methods and to compositions for use therein and, specifically to a method for improving the characteristics of sulfate bearing soils by treating with soluble aluminum ion compounds in conjunction with lime stabilization.

2. Description of the Prior Art

For many years, calcium based material in the form of hydrated lime, $Ca(OH)_2$ or quicklime, $CaO$, has been widely used as an additive to (1) stabilize highly plastic clay soils; (2) to prevent the shrinking and swelling characteristics of such soils and to (3) increase the load carrying ability of the treated soil. This system of treating clay bearing soils has been highly successful and economical, especially in the cases of highway and airport construction, and has been specified by most of the highway and transportation departments in the contiguous United States. In the past, subgrades have been improved as building sites, streets, runways, railroads, for remedial stabilization of existing structures, slope stabilization and for landfill stabilization, to list a few typical examples. Areas void in good, low plasticity, construction materials for building highways, airports, parking lots, building foundations and the like have fortuitously been found to have expansive clays, such as montmorillonite or kaolinite type clay soils, which can be economically and effectively treated with lime to provide base and sub-base soil of low plasticity and low water susceptibility. Lime and lime slurries have been worked into the top layers of such soils; for example, 6 to 36 inches in depth to improve and stabilize such soils or subgrades. Chemical soil stabilization by injection of lime slurry at predetermined depths below the soil surface is also known using freshly slaked quicklime or hydrated lime slurries.

Such lime-treated, base course layers build strength over time, days, weeks, and months due to pozzolanic soil reactions. Strength development to over 2000 p.s.i. has been documented. These pozzolanic reactions, resulting from the combination of native silica and free alumina provided by the clay in a high pH environment, and lime which provides the calcium and high pH driving force, produce calcium silicate hydrates (CSH) and calcium aluminate hydrates (CAH)—the major strength-producing components. The reaction of calcium hydroxide with the silica and alumina in the clay minerals to form the CSH and CAH is a slow process and can continue for weeks or months after the initial calcium hydroxide treatment. This slow process is what can cause the adverse sulfate swell.

Pretreating building sites for improving the strength and volume change characteristics of the soil is a long known problem facing the civil and architectural engineer. There are many examples in the prior art of methods and materials used to stabilize soils, or to improve subgrades in the subsurface layers adjacent the surface of the earth for a variety of purposes. Thus, in the past, subgrades have been improved as building sites, streets, runways, railroads, for remedial stabilization of existing structures, slope stabilization and for landfill stabilization, to list several typical examples. Lime and lime slurries have been worked into the top layers of the earth; for example 6 to 36 inches in depth, to improve and stabilize soils or subgrades. Despite these advances in the art, a need continues to exist for a method for improving the characteristics of soils or subgrades, particularly those soils which have a high sulfate content making them subject to undesirable swell or expansion.

One method proposed was the addition of barium salts to form insoluble barium sulfate which would eliminate the potential of sulfate swell caused by the formation of ettringite or similar sulfate swelling species. Unfortunately barium salts are highly toxic and thus not an appropriate use in the lime stabilization process.

Thus a need exists for such a method which is simple and economical in practice and which is compatible with existing lime stabilization techniques.

(2) BRIEF SUMMARY OF THE INVENTION

The method of the invention reduces the delayed swelling action of sulfates in clay bearing soils. In the method of the invention, soils having high sulfate content are treated by contacting the soils with soluble aluminum ions in an amount effective to react rapidly with sulfates present in the soils, thereby forming calcium alumina sulfate hydrate, ettringite, prior to any compaction or pavement of the treated stabilized soil. By reacting with the sulfates in the soil during the initial lime stabilization treatment the potential for delayed sulfate induced heaving of the pavement is greatly reduced or eliminated.

In spite of advances in lime (calcium hydroxide) soil stabilization techniques, it has been found that soluble sulfates, present in certain sulfate bearing soils, react with calcium hydroxide and free aluminum to form the water sensitive mineral ettringite ($3CaO.Al_2O_3.3CaSO_4.32H_2O$). Expansion due to the growth of ettringite in lime stabilized sulfate soils often produces severe problems, for instance, in the construction and performance of pavement foundation systems. The amount and type of sulfates present in the soil, namely sodium sulfate and/or calcium sulfate, and the amount and type of clay material present are properties which play key roles in the post-stabilization expansion developed over time in lime treated sulfate soils. The formation of ettringite is also known to be responsible for the deterioration of concrete by sulfate attack.

Because the quantity of sulfates present generally dictates the extent to which ettringite will form, it is important to evaluate sulfate content in soils intended for construction purposes. Simply stated, the greater the content of soluble sulfates in a soil, the greater the potential for the growth of ettringite.

In the method of the invention, sulfate bearing soils are treated with soluble aluminum ions during the initial lime stabilization process to rapidly form ettringite prior to compaction and pavement. The formation of ettringite in lime stabilized soils is not a problem if it is form early iin the stabilization process. Sulfate induced swell is only detrimental if it occurs after compaction and pavement of the treated soil. The method can conveniently be carried out by pretreating the soils with soluble aluminum ions. Thereafter, the soils are further stabilized by the application of lime to the soils. The soluble aluminum ions can also be mixed with the lime slurry and added to the soil together. The effectiveness of pretreatment with soluble aluminum ions is affected by a number of factors, to be discussed.

The fact that sodium sulfate and calcium sulfate (gypsum) have different solubility's suggests that the form of sulfates present in a soil plays an active role in the degree to which ettringite will form. Gypsum is approximately 100 times less soluble than other sulfate minerals normally found in soils. Gypsum is the most common sulfate mineral found in soils due to its relatively low solubility.

The percentage and type of clay minerals present in a soil generally dictates the amount of lime required to stabilize the soil. Soils with a high clay content or an initial high plasticity index (PI) and swell, require greater amounts of lime to effectively reduce the plasticity, eliminate the swell, and stabilize the soil. However, the addition of lime to a sulfate bearing soil provides calcium which reacts with the sulfates to form gypsum, which may react with aluminum to form ettringite.

The type or types of clay present are also believed to be major factors in determining the strength and swell potential in lime stabilization. Smectites are three layered clays which are highly expansive. Thus, a soil containing large amounts of smectite will require more lime to become stabilized. However, the two layered structure of kaolinite may allow it to be a greater source of aluminum needed for the formation of ettringite in sulfate bearing soils.

(3) BRIEF DESCRIPTION OF THE DRAWINGS

None

(4) DETAILED DESCRIPTION OF THE INVENTION

The tests which follow were conducted to determine if reactions that form ettringite could be accelerated in sulfate bearing soils by pretreating them with soluble aluminum ions in an effort to rapidly remove the soluble sulfate ions during the initial mixing of the calcium hydroxide with the soil, thus eliminating the adverse sulfate swelling that can occur during compaction and paving.

Three soils are included in the tests, Table 1:

TABLE 1

| Soil samples |
|---|
| Typical garden soil |
| Low PI soil 25 PI |
| High PI soil 40 PI |

To insure that the soils had high levels of sulfate, gypsum, calcium sulfate, 10,000 PPM was added to each of the soils. Soils that contain over 2,000 PPM sulfate has historically been associated with adverse sulfate swell.

The typical testing procedures were:
Control:
500 grams of soil was placed in a plastic container
9 grams of gypsum (10,000 PPM) was added to the soil
150 gram of water was added to the soil
45 grams of hydrated lime (9% HL to soil) was added and the soil was mixed in the closed plastic container.

An exact match of the control was prepared but the soluble aluminum ions were added and mixed with the lime treated high sulfate soil. Two different levels of aluminum ions were typically added to the high sulfate lime treated soil samples. Aluminum Chloride, Aluminum Nitrate, and Sodium Aluminate were utilized as sources of soluble aluminum ions, and Aluminum Trihydrate, and Meta Kaolin were also tested to determine if they could supply the fast reacting soluble aluminum ions.

65 gram of the treated soil (representing 10% of the sample) were removed from the closed plastic contain as a function of time, diluted with 500 gm of water, vacuumed filtered and then diluted to 1000 gram and tested for soluble sulfate ions.

Table 2 shows that the addition of soluble aluminum ions, Aluminum Nitrate, during the initial treatment of the lime stabilized soil lead to a rapid reduction of the soluble sulfate ions in the soil.

TABLE 2

| Soluble Sulfate ions remaining in soil (PPM) | | | |
|---|---|---|---|
| | | Additive | |
| Time | None | Aluminum Nitrate | |
| Hours | 0 | 1440 PPM | 2880 PPM |
| 0 | 9,200 | 9,200 | 9,200 |
| 1 | 5,200 | 3,400 | 2,000 |
| 5 | 5,400 | 2,800 | 1,060 |
| 26 | 4,200 | | |
| 70 | 3,000 | | |

Within 5 hours after mixing the soluble aluminum ions into the high sulfate lime treated soil the concentration of soluble sulfate ions decreased to low safe levels of soluble sulfate. With increased concentration of soluble aluminum ions the more rapid the decrease in soluble sulfate. The decrease in soluble sulfate ions with the addition of soluble aluminum ions was the result of the rapid formation of ettringite or similar calcium alumina sulfate hydrate species.

Table 3 shows similar results with the addition of Aluminum Chloride:

TABLE 3

| Soluble Sulfate ions remaining in soil (PPM) | | | |
|---|---|---|---|
| | | Additive | |
| Time | None | Aluminum Chloride | |
| Hours | 0 | 1220 PPM | 2440 PPM |
| 0 | 9,200 | 9,200 | 9,200 |
| 1 | 5,200 | 2,800 | 2,800 |
| 5 | 5,400 | 2,600 | 1,040 |
| 26 | 4,200 | | |
| 70 | 3,000 | | |

Table 4 with the addition of Sodium Aluminate confirms that the addition of any form of soluble aluminum ions can rapidly react with the soluble sulfate ions and thus eliminate the adverse delayed formation of ettringite.

TABLE 4

| Soluble Sulfate ions remaining in soil (PPM) | | | |
|---|---|---|---|
| | | Additive | |
| Time | None | Sodium Aluminate | |
| Hours | 0 | 1700 PPM | 3400 PPM |
| 0 | 9,200 | 9,200 | 9,200 |
| 1 | 5,200 | 2,400 | 1,160 |
| 5 | 5,400 | 2,800 | 1,800 |
| 26 | 4,200 | | |
| 70 | 3,000 | 1,320 | 1,170 |

Tables 5 and 6 show that the addition of Aluminum Trihydrate and Meta Kaolin do not have the rapid soluble aluminum ions in the initial phase of lime stabilization, and thus do not react with the soluble sulfate ions in the soil.

TABLE 5

Soluble Sulfate ions remaining in soil (PPM)

| Time | Additive | | |
|---|---|---|---|
| | None | Alumina Trihydrate | |
| Hours | 0 | 4,000 PPM | 8,000 PPM |
| 0 | 7,000 | 7,000 | 7,000 |
| 4 | 4,200 | 5,100 | 5,400 |
| 28 | 3,100 | 4,300 | 4,100 |
| 76 | 3,500 | 4,100 | 4,600 |

TABLE 6

Soluble Sulfate ions remaining in soil (PPM)

| Time | Additive | | |
|---|---|---|---|
| | None | Metakaolin | |
| Hours | 0 | 1460 PPM | 2920 PPM |
| 0 | 9,200 | 9,200 | 9,200 |
| 1 | 5,200 | 6,400 | 6,800 |
| 6 | 5,400 | 4,400 | 4,200 |
| 24 | 4,200 | 4,400 | 4,400 |
| 67 | 3,000 | 3,200 | 3,000 |

Thus the addition of Aluminum Trihydrate or Meta Kaolin provide additional evidence that it is not the total amount of aluminum which slowly becomes soluble in the lime treated high sulfate soil, but the amount of highly reactive soluble aluminum ions that can eliminate the potential delayed adverse sulfate swell.

Table 7 shows the results of the addition of Aluminum nitrate to a 25 PI soil. This soil was a reactive soil that had clay minerals that reacted with the calcium hydroxide to form soluble aluminum ions after 24 hours thus lowering the soluble sulfate concentration from 10000 to 2000 PPM. The addition of soluble aluminum ions accelerated the process to only 6 hours.

TABLE 7

Soluble Sulfate ions remaining in soil (PPM)
25 PI Soil

| Time | Additive | |
|---|---|---|
| | None | Aluminum Nitrate |
| Hours | 0 | 1440 PPM |
| 0 | 10,000 | 10,000 |
| 1 | 7,400 | 4,200 |
| 6 | 6,000 | 1920 |
| 12 | 5,400 | 800 |
| 25 | 2000 | 400 |
| 96 | 760 | 200 |
| 264 | 240 | 115 |

Table 8 details results for the 40 PI soil. This soil was less reactive initially to the lime treatment and showed the advantage of the treatment with the soluble aluminum ions.

TABLE 8

Soluble Sulfate ions remaining in soil (PPM)
40 PI Soil

| Time | Additive | |
|---|---|---|
| | None | AluminumNitrate |
| Hours | 0 | 1300 PPM |
| 0 | 10,000 | 10,000 |
| 1 | 8,600 | 4,800 |
| 5 | 8,200 | 3400 |
| 22 | 7,400 | 1780 |
| 72 | 4400 | 420 |
| 122 | 3000 | 280 |

During the lime stabilization process it may be advantageous to add the soluble aluminum ions to the lime slurry and thus eliminate the additional step of adding the soluble aluminum compound to the soil. Table 9 shows comparable results of either adding the soluble aluminum ions directly into the soil or with the lime slurry.

TABLE 9

Soluble Sulfate ions remaining in soil (PPM)

| Time | Additive | | |
|---|---|---|---|
| | | Aluminum Nitrate 1440 PPM | |
| Hours | None | Added to soil | Added to lime slurry |
| 0 | 9200 | 9200 | 9200 |
| 1 | 5200 | 3400 | 5000 |
| 5 | 5400 | 2800 | 3200 |
| 26 | 4200 | | 1680 |
| 70 | 3000 | 860 | 840 |

I claim:

1. A method for reducing the delayed swelling action of soluble sulfates currently present in clay bearing soils comprising:
    In a first step, pretreating the clay soil by adding a sufficient amount of a soluble aluminum ion compound into the clay bearing soil, wherein the soluble aluminum ion compound rapidly reacts with the soluble sulfates present in the clay bearing soil;
    In a second step, further adding a calcium hydroxide ion compound to the clay bearing soil by a lime stabilization process;
    Wherein the soluble aluminum ion compound, the calcium hydroxide ion compound, and the soluble sulfates in the clay bearing soil immediately react to start the formation of ettringite or calcium alumina sulfate hydrate, prior to compacting and constructing on the soil;
    Wherein the immediate formation of said ettringite or calcium alumina sulfate hydrate reduces the delayed swelling action of soluble sulfate in the compacted clay bearing soil.

2. The method of claim 1, wherein the soluble aluminum ion compound is selected from the group consisting of aluminum chloride, aluminum nitrate, sodium aluminate.

* * * * *